United States Patent
Thomasson et al.

(10) Patent No.: US 11,028,254 B2
(45) Date of Patent: *Jun. 8, 2021

(54) RUBBER COMPOSITION COMPRISING A SPECIFIC CRUMB RUBBER

(71) Applicant: COMPAGNIE GENERALE DES ETABLISSEMENTS MICHELIN, Clermont-Ferrand (FR)

(72) Inventors: Damien Thomasson, Clermont-Ferrand (FR); Olivia Cuscito, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 0 days.

This patent is subject to a terminal disclaimer.

(21) Appl. No.: 16/471,610

(22) PCT Filed: Dec. 19, 2017

(86) PCT No.: PCT/FR2017/053699
§ 371 (c)(1),
(2) Date: Jun. 20, 2019

(87) PCT Pub. No.: WO2018/115720
PCT Pub. Date: Jun. 28, 2018

(65) Prior Publication Data
US 2020/0131342 A1    Apr. 30, 2020

(30) Foreign Application Priority Data

Dec. 20, 2016 (FR) ..................... 1662878

(51) Int. Cl.
| C08L 7/00 | (2006.01) |
| B60C 1/00 | (2006.01) |
| C08F 36/06 | (2006.01) |
| C08F 36/08 | (2006.01) |
| C08K 3/04 | (2006.01) |
| C08K 3/36 | (2006.01) |
| C08L 19/00 | (2006.01) |
| C08K 3/06 | (2006.01) |
| C08K 5/09 | (2006.01) |
| C08K 5/18 | (2006.01) |
| C08K 5/47 | (2006.01) |

(52) U.S. Cl.
CPC .............. *C08L 7/00* (2013.01); *B60C 1/0016* (2013.01); *C08F 36/06* (2013.01); *C08F 36/08* (2013.01); *C08K 3/04* (2013.01); *C08K 3/36* (2013.01); *C08L 19/003* (2013.01); *C08K 3/06* (2013.01); *C08K 5/09* (2013.01); *C08K 5/18* (2013.01); *C08K 5/47* (2013.01); *C08L 2205/025* (2013.01); *C08L 2312/00* (2013.01)

(58) Field of Classification Search
CPC .................................................. C08L 19/003
See application file for complete search history.

(56) References Cited

U.S. PATENT DOCUMENTS

| 4,161,464 A | 7/1979 | Nicholas |
| 5,227,425 A | 7/1993 | Rauline |
| 5,602,186 A | 2/1997 | Myers et al. |
| 5,798,394 A | 8/1998 | Myers et al. |
| 5,852,099 A | 12/1998 | Vanel |
| 5,900,449 A | 5/1999 | Custodero et al. |
| 6,420,488 B1 | 7/2002 | Penot |
| 6,433,064 B1 | 8/2002 | Gorl et al. |
| 6,536,492 B2 | 3/2003 | Vasseur |
| 7,250,463 B2 | 7/2007 | Durel et al. |
| 7,335,692 B2 | 2/2008 | Vasseur et al. |
| 7,344,777 B2 | 3/2008 | Kino et al. |
| 7,445,170 B2 | 11/2008 | Cialone et al. |
| 7,820,771 B2 | 10/2010 | Lapra et al. |
| 7,861,958 B2 | 1/2011 | Waznys et al. |
| 8,461,269 B2 | 6/2013 | Varagniat et al. |
| 8,883,929 B2 | 11/2014 | Gandon-Pain et al. |
| 9,815,974 B2 | 11/2017 | Jasiunas et al. |
| 2001/0034389 A1 | 10/2001 | Vasseur |
| 2004/0127617 A1 | 7/2004 | Vasseur et al. |
| 2005/0004297 A1 | 1/2005 | Durel et al. |
| 2005/0037199 A1 | 2/2005 | Kino et al. |
| 2007/0060711 A1 | 3/2007 | Perera et al. |
| 2008/0132644 A1 | 6/2008 | Lapra et al. |
| 2009/0270558 A1 | 10/2009 | Gandon-pain et al. |
| 2010/0022714 A1 | 1/2010 | Varagniat et al. |
| 2011/0021702 A1 | 1/2011 | Gandon-Pain et al. |
| 2011/0039976 A1 | 2/2011 | Vasseur |

(Continued)

FOREIGN PATENT DOCUMENTS

| CN | 103923356 A | 7/2014 |
| EP | 0501227 A1 | 9/1992 |

(Continued)

OTHER PUBLICATIONS

Machine Translation of JP 2010-013494 A, 2020 (Year: 2020).*
Technical Data Sheet, GR. 555 Reclaim/GRP NRF 40R Tyre Reclaim Introduction, XP055395952 (retrieved from URL: http://www.allcocks.co.uk/files/lib/317/GR 555 Reclaim-GRP NRF 40R Tyre Reclaim on Aug. 3, 2017).
U.S. Appl. No. 16/471,601.
International Search Report dated Mar. 29, 2018, in corresponding PCT/FR2017/053699 (4 pages).
A.J. Gordon et al., "H. Mesh Sizes and Particle Diameter", The Chemist's Companion: A Handbook of Practical Data, Techniques, and References, p. 371 (1972).
Mesh to Micron Conversion Table, Ecologix (2018).

Primary Examiner — Liam J Heincer
(74) *Attorney, Agent, or Firm* — Venable LLP

(57) ABSTRACT

A rubber composition is based on at least an elastomer, a reinforcing filler and a crosslinking system and a crumb rubber, said crumb having an isoprene elastomer content of greater than 50 phr in the composition of the crumb and a chloroform extract with a weight-average molecular weight of less than 10 000 g/mol.

24 Claims, No Drawings

(56) References Cited

U.S. PATENT DOCUMENTS

| | | |
|---|---|---|
| 2012/0208948 A1 | 8/2012 | Gandon-Pain et al. |
| 2012/0252910 A1* | 10/2012 | Yen .................. C08J 11/10 521/41 |
| 2012/0316283 A1 | 12/2012 | Rosenmayer et al. |
| 2014/0196828 A1 | 7/2014 | Miyazaki |
| 2014/0228505 A1* | 8/2014 | Papp .................. C08L 19/003 524/526 |
| 2015/0315369 A1 | 11/2015 | Rosenmayer et al. |
| 2016/0152805 A1 | 6/2016 | Jasiunas et al. |
| 2016/0200899 A1 | 7/2016 | Forciniti et al. |
| 2016/0208082 A1 | 7/2016 | Jasiunas et al. |
| 2017/0369686 A1 | 12/2017 | Rosenmayer et al. |
| 2019/0382563 A1* | 12/2019 | Thomasson ............... C08L 9/00 |
| 2019/0382564 A1* | 12/2019 | Thomasson ............. C08L 21/00 |
| 2020/0095401 A1* | 3/2020 | Thomasson ........... C08L 19/003 |
| 2020/0101793 A1* | 4/2020 | Tregouet .................. C08L 7/00 |

FOREIGN PATENT DOCUMENTS

| | | |
|---|---|---|
| EP | 0735088 A1 | 10/1996 |
| EP | 0810258 A1 | 12/1997 |
| EP | 1 454 942 A1 | 9/2004 |
| EP | 3 045 323 A1 | 7/2016 |
| EP | 3045492 A1 | 7/2016 |
| FR | 2 999 579 B1 | 5/2016 |
| JP | 6-256575 A | 9/1994 |
| JP | 2002-284928 A | 10/2002 |
| JP | 2002-338743 A | 11/2002 |
| JP | 2007-63507 A | 3/2007 |
| JP | 2009-35603 A | 2/2009 |
| JP | 2010-13494 | 1/2010 |
| JP | 2011-148893 A | 8/2011 |
| JP | 2012-62429 A | 3/2012 |
| KR | 20140066293 A | 6/2014 |
| WO | 97/15614 A1 | 5/1997 |
| WO | 97/36724 A2 | 10/1997 |
| WO | 99/16600 A1 | 4/1999 |
| WO | 00/05300 A1 | 2/2000 |
| WO | 00/05301 A1 | 2/2000 |
| WO | 02/088238 A1 | 11/2002 |
| WO | 03/016387 A1 | 2/2003 |
| WO | 2006/069792 A1 | 7/2006 |
| WO | 2006/069793 A1 | 7/2006 |
| WO | 2008/003434 A1 | 1/2008 |
| WO | 2008/003435 A1 | 1/2008 |
| WO | 2009/083160 A1 | 7/2009 |
| WO | 2009/137585 A2 | 11/2009 |
| WO | 2016/105932 A1 | 6/2016 |

\* cited by examiner

RUBBER COMPOSITION COMPRISING A SPECIFIC CRUMB RUBBER

BACKGROUND

The invention relates to compositions, especially for tyres, and more particularly to compositions comprising a crumb rubber.

Indeed, it is at the current time advantageous for tyre manufacturers to find solutions to lower the costs of rubber compositions without penalizing the performances of the tyres using these compositions.

It is known in the prior art that crumb rubbers can be used in tyre production. For example, document U.S. 2014/0228505 describes the use of a crumb rubber having a size of less than 60 mesh (250 μm) in compositions for tyres.

Presently, the applicants have shown that the composition per se of the crumbs used has an impact on the properties of the compositions comprising these crumb rubbers. In particular, the applicants have found a means of obtaining excellent rolling resistance, wear resistance and tear strength properties in compositions comprising specific crumbs.

SUMMARY

The invention thus relates to a rubber composition based on at least an elastomer, a reinforcing filler and a crosslinking system and a crumb rubber, said crumb having an isoprene elastomer content of greater than 50 phr in the composition of the crumb and a chloroform extract with a weight-average molecular weight of less than 10 000 g/mol.

The invention also relates to a tyre comprising a composition as defined above, preferably in all or part of the tread thereof.

Preferentially, the tyre according to the invention will be selected from the tyres intended to equip a two-wheeled vehicle, a passenger vehicle, or else a "heavy goods" vehicle (that is to say, underground train, bus, off-road vehicles, heavy road transport vehicles, such as lorries, tractors or trailers), or else aircraft, construction equipment, heavy agricultural vehicles or handling vehicles.

DETAILED DESCRIPTION

I—Constituents of the Composition

The rubber compositions according to the invention are based on at least an elastomer, a reinforcing filler and a crosslinking system and a crumb rubber, said crumb having an isoprene elastomer content of greater than 50 phr in the composition of the crumb and a chloroform extract with a weight-average molecular weight of less than 10 000 g/mol.

The expression "composition based on" should be understood as meaning a composition comprising the mixture and/or the product of the in situ reaction of the various base constituents used, some of these constituents being able to react and/or being intended to react with one another, at least partially, during the various phases of manufacture of the composition or during the subsequent curing, modifying the composition as it is prepared at the start. Thus, the compositions as employed for the invention may be different in the non-crosslinked state and in the crosslinked state.

Moreover, for the purposes of the present patent application, the term "phr", which is well known to those skilled in the art, means part by weight per hundred parts of elastomers, within the meaning of the preparation of the composition before curing. That is to say, in the case of the presence of a crumb rubber in a composition, the term "phr" means part by weight per hundred parts of "new" elastomers, thus excluding from the base 100 the elastomers contained in the crumb rubber. Of course, the crumb itself has a rubber composition of which the ingredients can also be expressed in phr, the term "phr" in this case denoting the amount in parts by weight per hundred parts of elastomers, within the meaning of the composition per se of the crumb.

In the present description, unless expressly indicated otherwise, all the percentages (%) shown are percentages by weight. Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

When reference is made to a "predominant" compound, this is understood to mean, for the purposes of the present invention, that this compound is predominant among the compounds of the same type in the composition, that is to say that it is the one which represents the greatest amount by weight among the compounds of the same type and in particular more than 50%, preferably more than 75%. Thus, for example, a predominant polymer is the polymer representing the greatest weight relative to the total weight of the polymers in the composition. In the same way, a "predominant" filler is the one representing the greatest mass among the fillers of the composition. By way of example, in a system comprising just one polymer, the latter is predominant within the meaning of the present invention and, in a system comprising two polymers, the predominant polymer represents more than half of the weight of the polymers. On the contrary, a "minor" compound is a compound which does not represent the greatest fraction by weight among the compounds of the same type.

For the purposes of the present invention, when reference is made to a "predominant" unit (or monomer) within the same compound (or polymer), this is intended to mean that this unit (or monomer) is predominant among the units (or monomers) forming the compound (or polymer), that is to say it is the one which represents the greatest fraction by weight among the units (or monomers) forming the compound (or polymer). Thus, for example, a resin predominantly composed of cyclopentadiene units is a resin in which the cyclopentadiene units represent the greatest amount by weight among all the units composing said resin. Similarly, a resin predominantly composed of units selected from the group consisting of cyclopentadiene, dicyclopentadiene, methylcyclopentadiene and mixtures thereof is a resin in which the sum of the units selected from the group consisting of cyclopentadiene, dicyclopentadiene, methylcyclopentadiene and mixtures thereof represents the greatest number by weight among all the units composing said resin. In other words, a "predominant" monomer is a monomer which represents the greatest fraction by weight in the polymer. On the contrary, a "minor" monomer is a monomer which does not represent the greatest molar fraction in the polymer.

In the present application, when reference is made to a ratio of the amounts of a compound A and of a compound B, or a ratio between the content of a compound A and the content of a compound B, this is always a ratio in the mathematical sense of the amount of compound A over the amount of compound B.

The compounds mentioned in the description can be of fossil or biobased origin. In the latter case, they may partially or completely result from biomass or be obtained from renewable starting materials resulting from biomass. Polymers, plasticizers, fillers, and the like, are concerned in particular.

I-1 Elastomer

The elastomer may be selected from the group consisting of diene elastomers and mixtures thereof.

It is recalled here that elastomer (or "rubber", the two terms being regarded as synonymous) of the "diene" type should be understood, in a known way, as meaning an (one or more is understood) elastomer resulting at least in part (i.e., a homopolymer or a copolymer) from diene monomers (monomers bearing two conjugated or non-conjugated carbon-carbon double bonds).

Diene elastomers can be classified into two categories: "essentially unsaturated" or "essentially saturated". "Essentially unsaturated" is understood to mean generally a diene elastomer resulting at least in part from conjugated diene monomers having a content of units of diene origin (conjugated dienes) which is greater than 15% (mol %); thus it is that diene elastomers such as butyl rubbers or copolymers of dienes and of alpha-olefins of EPDM type do not come within the preceding definition and can in particular be described as "essentially saturated" diene elastomers (low or very low content, always less than 15%, of units of diene origin). In the category of "essentially unsaturated" diene elastomers, a "highly unsaturated" diene elastomer is understood in particular to mean a diene elastomer having a content of units of diene origin (conjugated dienes) which is greater than 50%.

Given these definitions, diene elastomer capable of being used in the compositions according to the invention is understood more particularly to mean:
(a) any homopolymer obtained by polymerization of a conjugated diene monomer having from 4 to 12 carbon atoms;
(b) any copolymer obtained by copolymerization of one or more conjugated dienes with one another or with one or more vinylaromatic compounds having from 8 to 20 carbon atoms;
(c) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;
(d) a copolymer of isobutene and of isoprene (butyl rubber) and also the halogenated versions, in particular chlorinated or brominated versions, of this type of copolymer.

Although it applies to any type of diene elastomer, those skilled in the art of tyres will understand that the present invention is preferably employed with essentially unsaturated diene elastomers, in particular of the above type (a) or (b).

The following are especially suitable as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, aryl-1,3-butadiene, 1,3-pentadiene or 2,4-hexadiene. The following, for example, are suitable as vinylaromatic compounds: styrene, ortho-, meta- or para-methylstyrene, "vinyltoluene" commercial mixture, para-(tert-butyl)styrene, methoxystyrenes, chlorostyrenes, vinylmesitylene, divinylbenzene or vinylnaphthalene.

The copolymers can contain between 99% and 20% by weight of diene units and between 1% and 80% by weight of vinylaromatic units. The elastomers may have any microstructure, which depends on the polymerization conditions used, in particular on the presence or absence of a modifying and/or randomizing agent and on the amounts of modifying and/or randomizing agent used. The elastomers may be, for example, block, random, sequential or microsequential elastomers and may be prepared in dispersion or in solution; they may be coupled and/or star-branched or else functionalized with a coupling and/or star-branching or functionalization agent. "Function" here is preferentially understood to mean a chemical group which interacts with the reinforcing filler of the composition.

Preferentially, the elastomer of the composition comprises predominantly an essentially unsaturated diene elastomer. The elastomer of the composition is preferably selected from the group consisting of polybutadienes (abbreviated to BRs), synthetic polyisoprenes (IRs) or natural polyisoprenes (NRs), butadiene copolymers, isoprene copolymers and mixtures of these elastomers. Such butadiene and isoprene copolymers are more preferentially, respectively, butadiene/styrene copolymers (SBRs) and isoprene/styrene copolymers (SIRs).

More preferentially, the predominant elastomer is selected from the group consisting of polybutadienes, natural or synthetic polyisoprenes and mixtures of these elastomers.

I-2 Reinforcing Filler

The composition according to the invention comprises a reinforcing filler. Use may be made of any type of reinforcing filler known for its abilities to reinforce a rubber composition which can be used for the manufacture of tyres, for example an organic filler, such as carbon black, a reinforcing inorganic filler, such as silica or alumina, or also a blend of these two types of filler.

Preferably, the content of reinforcing filler is within a range extending from 5 to 200 phr, preferably from 20 to 160 phr.

For the needs of the invention, the reinforcing filler is preferentially selected from the group consisting of silicas, carbon blacks, and mixtures thereof. More preferentially, the reinforcing filler is predominantly carbon black, preferably in a content within a range extending from 30 to 90 phr. Likewise preferentially, the reinforcing filler is predominantly silica, preferably in a content within a range extending from 30 to 90 phr.

All carbon blacks, in particular "tyre-grade" blacks, are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example N660, N683 or N772). The carbon blacks might, for example, be already incorporated in an isoprene elastomer in the form of a masterbatch (see, for example, applications WO 97/36724 or WO 99/16600).

Mention may be made, as examples of organic fillers other than carbon blacks, of functionalized polyvinyl organic fillers, such as described in applications WO-A-2006/069792, WO-A-2006/069793, WO-A-2008/003434 and WO-A-2008/003435.

The composition can comprise one type of silica or a blend of several silicas. The silica used may be any reinforcing silica known to those skilled in the art, especially any precipitated or fumed silica with a BET surface area and a CTAB specific surface area that are both less than 450 m²/g, preferably from 30 to 400 m²/g. Mention will be made, as highly dispersible precipitated silicas ("HDSs"), for example, of the Ultrasil 7000 and Ultrasil 7005 silicas from the company Evonik, the Zeosil 1165MP, 1135MP and 1115MP silicas from the company Solvay, the Hi-Sil EZ150G silica from the company PPG, the Zeopol 8715, 8745 and 8755 silicas from the company Huber, treated precipitated silicas, such as, for example, the silicas "doped" with aluminium described in application EP-A-0735088, or the silicas with a high specific surface area as described in application WO 03/16387. The silica preferably has a BET surface area of between 45 and 400 m²/g, more preferentially of between 60 and 300 m²/g.

These compositions can optionally also comprise, in addition to the coupling agents, coupling activators, agents for covering the inorganic fillers or more generally processing aids capable, in a known way, by virtue of an improvement in the dispersion of the filler in the rubber matrix and of a lowering of the viscosity of the compositions, of improving their ability to be processed in the raw state, these agents being, for example, hydrolysable silanes, such as alkylalkoxysilanes, polyols, fatty acids, polyethers, primary, secondary or tertiary amines, or hydroxylated or hydrolysable polyorganosiloxanes.

Those skilled in the art will understand that, as filler equivalent to silica described in the present section, use might be made of a reinforcing filler of another nature, especially organic nature, provided that this reinforcing filler is covered with a layer of silica or else comprises functional sites, in particular hydroxyl sites, at its surface which require the use of a coupling agent in order to form the bond between the filler and the elastomer.

The physical state in which the reinforcing filler is provided is not important, whether it is in the form of a powder, of microbeads, of granules, of beads or any other appropriate densified form.

I-3 Crosslinking System

In the composition of the invention, any type of crosslinking system known to those skilled in the art for rubber compositions may be used.

The crosslinking system is preferably a vulcanization system, that is to say based on sulfur (or on a sulfur-donating agent) and a primary vulcanization accelerator. Various known secondary vulcanization accelerators or vulcanization activators, such as zinc oxide, stearic acid or equivalent compounds, or guanidine derivatives (in particular diphenylguanidine), may be added to this base vulcanization system, being incorporated during the first non-productive phase and/or during the productive phase, as described subsequently.

The sulfur is used at a preferential content of between 0.5 and 10 phr, more preferentially of between 0.5 and 5 phr, in particular between 0.5 and 3 phr.

The vulcanization system of the composition according to the invention may also comprise one or more additional accelerators, for example compounds of the family of the thiurams, zinc dithiocarbamate derivatives, sulfenamides, guanidines or thiophosphates. Use may be made in particular of any compound capable of acting as accelerator of the vulcanization of diene elastomers in the presence of sulfur, especially accelerators of thiazole type and also derivatives thereof, accelerators of the thiuram type, and zinc dithiocarbamates. These accelerators are more preferentially selected from the group consisting of 2-mercaptobenzothiazole disulfide (abbreviated to "MBTS"), N-cyclohexyl-2-benzothiazolesulfenamide (abbreviated to "CBS"), N,N-dicyclohexyl-2-benzothiazolesulfenamide (abbreviated to "DCBS"), N-(tert-butyl)-2-benzothiazolesulfenamide (abbreviated to "TBBS"), N-(tert-butyl)-2-benzothiazolesulfenimide (abbreviated to "TBSI"), zinc dibenzyldithiocarbamate (abbreviated to "ZBEC") and mixtures of these compounds. Preferably, use is made of a primary accelerator of the sulfenamide type.

I-4 Crumb Rubber

The composition of the invention also comprises a crumb rubber (abbreviated to "crumb" in the remainder of the text).

The crumbs are in the form of granules, optionally made into a sheet of rubber. Usually, crumb rubbers are derived from milling or micronization of cured rubber compositions already used for a first application, for example in tyres; they are a product of the recycling of materials. The crumbs are preferably in the form of microparticles.

The term "microparticles" is intended to mean particles which have a size, namely their diameter in the case of spherical particles or their largest dimension in the case of anisometric particles, of a few tens of or a few hundred microns.

The crumbs usually consist of a composition based on an elastomer and a filler. They also usually comprise all the ingredients used in rubber compositions, such as plasticizers, antioxidants, vulcanization additives, etc.

The crumbs useful for the invention have an isoprene elastomer content of greater than 50 phr in the composition of the crumb and a chloroform extract with a weight-average molecular weight of less than 10 000 g/mol.

Preferably, the crumb rubber has an isoprene elastomer content within a range extending from 60 to 100 phr, preferably from 70 to 100 phr in the composition of the crumb. Very preferentially, the isoprene elastomer content in the crumb is 100 phr, that is to say that the isoprene elastomers constitute all of the elastomers of the composition of the crumb.

For the purposes of the present invention, the term "isoprene elastomer" is intended to mean a homopolymer or a copolymer predominantly derived from the isoprene monomer. Thus, it may in particular be synthetic polyisoprene (IR), natural rubber (NR) or a copolymer of isoprene, such as an isoprene/styrene copolymer (SIR).

Preferentially, the isoprene elastomer in the crumb rubber is selected from the group consisting of synthetic polyisoprenes, natural rubbers and mixtures thereof. Preferably, the isoprene elastomer in the crumb rubber is a natural rubber.

The isoprene elastomer content in the composition of the crumb can be measured by NMR as described below.

The specific crumbs comprising an isoprene elastomer content of greater than 50 phr may be commercially available. According to one possible embodiment, use may be made of the recycling of tyres, the composition of which is known, so as to be sure that the composition of the crumb meets the specific criteria for the invention. The crumb itself, if it is not directly commercially purchased, can be obtained according to the milling or micronization techniques known to those skilled in the art.

Preferentially, the crumb that is of use in the invention comprises a diene elastomer. This elastomer preferentially represents at least 30% by weight, more preferentially at least 40% by weight, even more preferentially at least 50% by weight of the weight of the crumb, said percentage being determined according to Standard ASTM E1131. More preferentially, the molar content of units of diene origin (conjugated dienes) present in the diene elastomer is greater than 50%, preferably between 50% and 70%.

According to one preferential embodiment of the invention, the crumb contains between 5% and 80% by weight of filler, more preferentially between 10% and 75%, and very preferentially between 15% and 70%.

The term "filler" is intended to mean herein any type of filler, whether reinforcing (typically having nanometric particles, with a weight-average size preferably of less than 500 nm, in particular between 20 and 200 nm) or non-reinforcing or inert (typically having micrometric particles, with a weight-average size preferably of greater than 1 μm, for example between 2 and 200 μm). The weight-average size of the nanometric particles is measured in a manner well known to those skilled in the art (by way of example, according to patent application WO 2009/083160 paragraph 1.1). The weight-average size of the micrometric particles can be determined by mechanical screening.

Mention will in particular be made, as examples of fillers known as reinforcing to those skilled in the art, of carbon black or of a reinforcing inorganic filler, such as silica or alumina in the presence of a coupling agent, or mixtures thereof.

According to one preferential embodiment of the invention, the crumb comprises, by way of filler, a reinforcing filler, in particular a carbon black or a mixture of carbon blacks.

The carbon black or the mixture of carbon blacks preferentially represents more than 50%, more preferentially more than 80%, even more preferentially more than 90% by weight of the weight of the reinforcing filler of the crumb. According to a more preferential embodiment, the reinforcing filler consists of a carbon black or a mixture of carbon blacks.

Very preferentially, the carbon black is present in the crumb in a content ranging from 20% to 40% by weight, more preferentially from 25% to 35% by weight.

All carbon blacks, in particular blacks of the HAF, ISAF, SAF, FF, FEF, GPF and SRF type, conventionally used in rubber compositions for tyres ("tyre-grade" blacks) are suitable as carbon blacks.

The crumb may contain all the other usual additives which are part of a rubber composition, in particular for tyres. Among these usual additives, mention may be made of vulcanization additives, non-reinforcing fillers such as chalk or kaolin, and protective agents. These additives may be in the crumb in the form both of a residue or of a derivative, since they were able to react during the steps for producing the composition or of crosslinking the composition from which the crumb is derived.

With regard to the constituents of the crumb, it is preferable, for the needs of the invention, for the crumb to have an acetone extract of between 3% and 30% by weight, more preferentially within a range extending from 5% to 25% by weight.

Likewise, it is preferable for the crumb to have a chloroform extract of between 5% and 85% by weight, more preferentially within a range extending from 5% to 50% by weight.

The crumbs may be simple ground/micronized rubber materials, without any other treatment. It is also known that these crumbs can undergo a treatment in order to modify them. This treatment can consist of a chemical functionalization or devulcanization modification. It may also be a thermomechanical, thermochemical, biological, etc., treatment.

Preferably for the invention, it is possible to use a crumb which has not undergone any modification by thermal and/or mechanical and/or biological and/or chemical treatment.

It is preferable for the crumb to have an acetone extract of between 3% and 15% by weight, more preferentially within a range extending from 3% to 10% by weight. Likewise, it is preferable for the crumb to have a chloroform extract of between 3% and 20% by weight, more preferentially within a range extending from 5% to 15% by weight. Preferentially, the chloroform extract of the crumb rubber has a weight-average molecular weight (Mw) of less than 8000 g/mol.

Preferably, the ratio of the chloroform extract to the acetone extract, expressed as weight percentage, is less than 1.5.

Likewise preferably, the crumb has an average particle size (D50) of between 10 and 400 μm, preferentially between 50 and 200 μm and more preferentially between 70 and 200 μm.

The milling can be carried out by various techniques, in particular cryogenic impact micronization, which make it possible to obtain particles of small size on rubber materials. Commercial equipment such as the CUM150 mill from the company Netzsch or the CW250 mill from the company Alpine can be used.

Preferentially, the crumb is present in a content within a range extending from 5% to 40% by weight, preferentially from 10% to 30% and more preferentially from 15% to 25%. In a standard composition intended for tyres, these weight contents correspond to contents of from 5 to 100 phr. Below 5 phr, the saving made would not be significant enough, whereas above 100 phr, it is possible for the cohesion properties of the composition to be penalized. Thus, the crumb content is preferably within a range extending from 10 to 90 phr, preferentially from 15 to 90 phr, more preferentially from 20 to 80 phr and very preferentially from 30 to 70 phr for optimum operation of the invention.

I-5 Other Possible Additives

The rubber compositions in accordance with the invention optionally also comprise all or a portion of the normal additives customarily used in elastomer compositions intended especially for the manufacture of treads, such as, for example, pigments, protective agents, such as anti-ozone waxes, chemical antiozonants or antioxidants, plasticizing agents other than those described above, anti-fatigue agents, reinforcing resins, or methylene acceptors (for example novolac phenolic resin) or donors (for example HMT or H3M).

The composition according to the invention may also comprise a plasticizing system. This plasticizing system may be composed of a hydrocarbon-based resin with a Tg of greater than 20° C., in addition to the specific hydrocarbon-based resin described above, and/or a plasticizing oil.

Of course, the compositions in accordance with the invention can be used alone or as a blend (i.e., as a mixture) with any other rubber composition which can be used for the manufacture of tyres.

It is obvious that the invention relates to the rubber compositions described above both in the "raw" or non-crosslinked state (i.e., before curing) and in the "cured" or crosslinked, or also vulcanized, state (i.e., after crosslinking or vulcanization).

II—Preparation of the Rubber Compositions

The compositions are manufactured in appropriate mixers, using two successive phases of preparation which are well known to those skilled in the art: a first phase of thermomechanical working or kneading (sometimes referred to as "non-productive" phase) at high temperature, up to a maximum temperature of between 110° C. and 200° C., preferably between 130° C. and 180° C., followed by a second phase of mechanical working (sometimes referred as "productive" phase) at lower temperature, typically below 110° C., for example between 60° C. and 100° C., during which finishing phase the crosslinking or vulcanization system is incorporated; such phases have been described, for example, in applications EP-A-0 501 227, EP-A-0 735 088, EP-A-0 810 258, WO00/05300 or WO00/05301.

The first (non-productive) phase is preferably carried out in several thermomechanical steps. During a first step, the elastomers, the reinforcing fillers and the crumb (and optionally the coupling agents and/or other ingredients, with the exception of the crosslinking system) are introduced into an appropriate mixer, such as a customary internal mixer, at a temperature between 20° C. and 100° C. and preferably between 25° C. and 100° C. After a few minutes, preferentially from 0.5 to 2 min, and a rise in the temperature to 90° C. or to 100° C., the other ingredients (that is to say, those which remain, if not all were put in at the start) are added all at once or in portions, with the exception of the crosslinking system, during a mixing ranging from 20 seconds to a few minutes. The total duration of the kneading, in this non-productive phase, is preferably between 2 and 10 minutes at a temperature of less than or equal to 180° C. and preferentially of less than or equal to 170° C.

After cooling the mixture thus obtained, the crosslinking system is then incorporated at low temperature (typically less than 100° C.), generally in an external mixer, such as an open mill; the combined mixture is then mixed (productive phase) for a few minutes, for example between 5 and 15 min.

The final composition thus obtained is subsequently calendered, for example in the form of a sheet or slab, in particular for laboratory characterization, or else extruded, in order to form, for example, a rubber profiled element used in the manufacture of semi-finished products for tyres. These products may then be used for the manufacture of tyres, according to techniques known to those skilled in the art, with the advantage of the invention, namely good tack of the layers on one another before curing of the tyre.

The crosslinking (or curing) is carried out in a known way at a temperature generally of between 130° C. and 200° C., under pressure, for a sufficient time which can vary, for example, between 5 and 90 min, as a function in particular of the curing temperature, of the crosslinking system adopted, of the kinetics of crosslinking of the composition under consideration or else of the size of the tyre.

The examples which follow illustrate the invention without, however, limiting it.

III—Exemplary Embodiments of the Invention

III-1 Characterization of the Crumb Rubbers and of the Rubber Compositions of the Examples In the examples, the crumb rubbers are characterized as indicated below.

Measurement of the Particle Size:

The particle size (in particular the D50) can be measured using a laser particle size analyser of the mastersizer 3000 type from the company Malvern. The measurement is carried out by the liquid route, diluted in alcohol after an ultrasound pretreatment for 1 min in order to guarantee particle dispersion. The measurement is carried out in accordance with Standard ISO-13320-1.

Measurement of the Acetone Extract:

The acetone extract content is measured according to Standard ISO1407 by means of an extractor of soxhlet type.

A sample test specimen (between 500 mg and 5 g) is introduced into an extraction chamber and then placed in the extractor tube of the soxhlet. A volume of acetone equal to two or three times the volume of the extractor tube is placed in the collector of the soxhlet. The soxhlet is subsequently assembled and then heated for 16 h.

The sample is weighed after extraction. The acetone extract content corresponds to the loss of weight of the sample during the extraction, related back to the initial weight thereof.

Measurement of the Chloroform Extract:

The chloroform extract content is measured according to Standard ISO1407 by means of an extractor of soxhlet type.

A sample test specimen (between 500 mg and 5 g) is introduced into an extraction chamber and then placed in the extractor tube of the soxhlet. A volume of chloroform equal to two or three times the volume of the extractor tube is placed in the collector of the soxhlet. The soxhlet is subsequently assembled and then heated for 16 h.

The sample is weighed after extraction. The chloroform extract content corresponds to the loss of weight of the sample during the extraction, related back to the initial weight thereof.

Measurement of the Average Molecular Weights of the Chloroform Extract:

The molecular weights are determined by size exclusion chromatography, according to a Moore calibration and according to Standard ISO16014.

The measurement of the weight-average molecular weight (Mw) of the chloroform extract is carried out by size exclusion chromatography (SEC) with a refractive index (RI) detector. The system is composed of an Alliance 2695 system from Waters, of a column oven from Waters and also of an RI 410 detector from Waters. The set of columns used is composed of two PL GEL MIXED D columns (300×7.5 mm 5 µm) followed by two PL GEL MIXED E columns (300×7.5 mm 3 µm) from the company Agilent. These columns are placed in a column oven thermostated at 35° C. The mobile phase used is non-anti-oxidized tetrahydrofuran. The flow rate of the mobile phase is 1 ml/min. The RI detector is also thermostated at 35° C.

The chloroform extract is dried under a nitrogen stream. The dry extract is then taken up at 1 g/l in non-anti-oxidized tetrahydrofuran at 250 ppm for 2 hours with stirring. The solution obtained is filtered using a syringe and a single-use 0.45 µm PTFE syringe filter. 100 µl of the filtered solution are injected into the conditioned chromatographic system at 1 ml/min and 35° C.

The Mw results are provided by integration of the chromatographic peaks detected by the RI detector above a value of 2000 g/mol. The Mw is calculated from a calibration carried out using polystyrene standards.

Measurement of the Carbon Black Weight Fraction:

The carbon black weight fraction is measured by thermogravimetric analysis (TGA) according to Standard NF T-46-07, on an instrument from the company Mettler Toledo, model "TGA/DSC1". Approximately 20 g of sample are introduced into the thermal analyser, then subjected to a thermal program from 25 to 600° C. under an inert atmosphere (pyrolysable phase), then from 400 to 750° C. under an oxidizing atmosphere (oxidizable phase). The weight of the sample is continuously measured throughout the thermal program. The black content corresponds to the loss of weight measured during the oxidizable phase related back to the initial weight of sample.

Determination of the Elastomers in the Composition of the Crumb

A characterization by HR-MAS NMR of the microstructure of the elastomers in a vulcanized mixture (crumbs) is used.

Approximately 40 mg of sample are inserted into a rotor 4 mm in diameter and with a volume of 92 µl, then swollen with a few drops of deuterated chloroform ($CDCl_3$).

The identification and the quantification of the units present in the sample are carried out by means of one-dimensional $^1$H and $^{13}$C Nuclear Magnetic Resonance experiments. All of the data are recorded in a magnetic field of 11.7 T with a Bruker Avance III HD spectrometer equipped with a 4 mm HR MAS (High Resolution—Magic Angle Spinning) probe. The experiments are acquired by magic angle spinning with a rotation frequency of 4 kHz. The axes of the isotropic chemical shifts are referenced on the basis of the CHCl$_3$ signal at 7.20 ppm in proton mode and of the CDCl$_3$ signal at 77.0 ppm in carbon-13 mode.

The 1D $^1$H spectra are recorded with a single pulse experiment having a duration corresponding to a tilt angle of 30°; the number of repetitions is 64 scans with a recycle delay of 3 seconds.

The 1D $^{13}$C spectra are recorded with a single pulse experiment having a duration corresponding to a tilt angle of 90° and decoupling of the $^1$Hs during the acquisition; the number of repetitions is 1024 scans with a recycle delay of 8 seconds.

The identification of the units is carried out on the $^{13}$C spectrum, the $^1$H spectrum being used to detect the presence of units present in small amount (<5% by weight).

The principal units detected are the following: Isoprene (1,4 cis-1,4trans-1,2 and 3,4), Butadiene (1,2-1,4 cis and 1,4 trans), Styrene, and Isobutylene.

Each unit present in the sample has its own $^{13}$C resonance line (ex: $\delta^{13}$C 1,4-cis isoprene=23.4 ppm), the intensity of which is directly linked to the amount of nuclei present in the sample.

The quantifications were carried out on the basis of the integration of the $^{13}$C NMR spectra using the TOPSPIN software, by integrating the signal characteristic of each of the units observed.

The crude results obtained as molar percentage are weighted by the molar mass of each of the units in order to obtain a weight percentage.

In the examples, the rubber compositions are characterized, before and/or after curing, as indicated below.

Tensile Tests at 60° C.:

These tensile tests make it possible to determine the moduli of elasticity and the properties at break and are based on Standard NF ISO 37 of December 2005. The nominal secant modulus (or apparent stress, in MPa, relative to the strain, which is unitless) is measured at 60° C. in second elongation (i.e., after an accommodation cycle) at the extension rate provided for the measurement itself) at 100% elongation (denoted MA100) and/or at 300% elongation (denoted MA300). The true stresses at break (in MPa) and the elongations at break (in %) are also measured. The breaking energy corresponds to the multiplication of the stress and the elongation at break.

The results of energy at break and of MA100 are given in base 100 in order to facilitate the reading and the understanding of the results; that is to say that the value 100 is arbitrarily assigned to the best control for subsequently comparing the values of the various solutions tested. In this way, a lower value of energy at break represents a decrease in tear strength performance (that is to say a decrease in the energy at break), whereas a higher value represents a better performance. Likewise, a lower value of MA100 represents a decrease in wear performance and in behaviour of the vehicle (that is to say a decrease in the modulus), whereas a higher value represents a better performance.

Dynamic Properties (After Curing):

The dynamic properties G* and tan(δ) max are measured on a viscosity analyser (Metravib V A4000) according to Standard ASTM D 5992-96. The response of a sample of vulcanized composition (cylindrical test specimen with a thickness of 4 mm and a cross section of 400 mm$^2$), subjected to a simple alternating sinusoidal shear stress, at a frequency of 10 Hz, under variable temperature conditions, especially at 60° C., according to Standard ASTM D 1349-99, is recorded. A peak-to-peak strain amplitude sweep is carried out from 0.1% to 50% (outward cycle) and then from 50% to 1% (return cycle). The results made use of are the complex dynamic shear modulus (G*) and the loss factor (tan δ). The maximum value of tan δ observed (tan(δ) max) and the difference in complex modulus (ΔG*) between the values at 0.1% and at 50% strain (Payne effect) are shown for the return cycle.

The lower the value for the tan(δ) at 60° C., the lower will be the hysteresis of the composition and thus the lower will be the rolling resistance. The results are expressed in terms of performance base 100, that is to say that the value 100 is arbitrarily assigned to the best control, in order to subsequently compare the tan(δ) at 60° C. (that is to say the hysteresis—and hence the rolling resistance) of the various solutions tested. The value in base 100 is calculated according to the operation: (value of tan(δ) at 60° C. of the control/value of tan(δ) at 60° C. of the sample)*100. In this way, a lower value represents a reduction in the hysteresis performance (that is to say an increase in the hysteresis), while a higher value represents a better hysteresis performance (that is to say a lower hysteresis).

III-2 Preparation of the Crumbs

For the implementation examples, the crumbs used are derived from the milling of a heavy-weight vehicle tyre tread composition as presented in Table 1 below. The milling is carried out on a piece of equipment, CUM150, from the company Netzsch using spike diameters of 3 mm and a mill rotation speed of 15 000 rpm. The flow rate of matter is about 50 kg/h and the facility is cooled in order to guarantee a mill outlet gas temperature of −60° C.

TABLE 1

| | Crumb composition (phr) | | | |
|---|---|---|---|---|
| | P0 | P1 | P2 | P3 |
| NR (1) | 0 | 60 | 80 | 100 |
| BR (2) | 0 | 20 | 20 | 0 |
| SBR (3) | 100 | 20 | 0 | 0 |
| Carbon black (4) | 54 | 54 | 48 | 48 |
| Carbon black (% by weight) | 33 | 33 | 30 | 30 |
| Antioxidant (5) | 2 | 3 | 3 | 3 |
| Stearic acid (6) | 2 | 2 | 2 | 2 |
| Zinc oxide (7) | 3 | 3 | 3 | 3 |
| Accelerator (8) | 1.5 | 1 | 1 | 1 |
| Sulfur | 1.5 | 1.5 | 1.5 | 1.5 |
| Acetone extract | 4.2% | 4.5% | 4.6% | 4.6% |
| Chloroform extract | 5.8% | 6.1% | 6.3% | 6.3% |
| Mw (Chloroform Extract) | 7000 g/mol | 7000 g/mol | 7000 g/mol | 7000 g/mol |
| D50 | 155 μm | 155 μm | 155 μm | 155 μm |

(1) NR: Natural rubber
(2) BR: polybutadiene, CB24 from Lanxess; 96% of 1,4-cis-; Tg = −107° C.
(3) SBR with 15.5% of styrene units and 24% of 1,2- units of the butadiene part (Tg = −65° C.)
(4) Carbon black, ASTM N234 or N375 grade
(5) N-(1,3-Dimethylbutyl)-N'-phenyl-p-phenylenediamine (Santoflex 6-PPD) from the company Flexsys
(6) Stearin, Pristerene 4931 from the company Uniqema
(7) Zinc oxide, industrial grade - from the company Umicore
(8) N-Cyclohexyl-2-benzothiazolesulfenamide (Santocure CBS from the company Flexsys)

III-3 Rubber Compositions

The compositions are manufactured with introduction of all of the constituents into an internal mixer, with the exception of the vulcanization system. The vulcanizing agents (sulfur and accelerator) are introduced into an external mixer at low temperature (the constituent rolls of the mixer being at around 30° C.). The crumbs can be introduced into the internal or external mixer.

The object of the examples presented in Table 2 is to compare the different rubber properties of a control composition (T) to the properties of a composition in accordance with the invention (C). The properties are presented in Table 3.

TABLE 2

|  | T1 | T2 | C1 | C2 | C3 |
|---|---|---|---|---|---|
| NR (1) | 80 | 80 | 80 | 80 | 80 |
| BR (2) | 20 | 20 | 20 | 20 | 20 |
| Carbon black (3) | 48 | 48 | 48 | 48 | 48 |
| Crumb P0 | 40 | 0 |  |  |  |
| Crumb (4) | 0 | 40 | 0 | 0 | 0 |
| Crumb P1 | 0 | 0 | 40 | 0 | 0 |
| Crumb P2 | 0 | 0 | 0 | 40 |  |
| Crumb P3 | 0 | 0 | 0 | 0 | 40 |
| Antioxidant (5) | 3 | 3 | 3 | 3 | 3 |
| Stearic acid (6) | 2 | 2 | 2 | 2 | 2 |
| Zinc oxide (7) | 3 | 3 | 3 | 3 | 3 |
| Accelerator (8) | 1 | 1 | 1 | 1 | 1 |
| Sulfur | 1.5 | 1.5 | 1.5 | 1.5 | 1.5 |

(1) NR: Natural rubber
(2) BR: polybutadiene, CB24 from Lanxess; 96% of 1,4-cis-; Tg = −107° C.
(3) Carbon black, ASTM N234 grade
(4) Crumb rubber sold under the name RNR30B01 by the company Rubber Ressources and as described below:
Crumb RNR30B01
Acetone extract          10.3%
Chloroform extract       25.9%
Mw (CHCl$_3$ extract)    34 500 g/mol
Elastomers               80 NR
Carbon black (% by weight)  30
(5) N-(1,3-Dimethylbutyl)-N'-phenyl-p-phenylenediamine (Santoflex 6-PPD) from the company Flexsys
(6) Stearin, Pristerene 4931 from the company Uniqema
(7) Zinc oxide, industrial grade - from the company Umicore
(8) N-Cyclohexyl-2-benzothiazolesulfenamide (Santocure CBS from the company Flexsys)

TABLE 3

|  | T1 | T2 | C1 | C2 | C3 |
|---|---|---|---|---|---|
| Tan(δ) 60° C. (base 100) | 100 | 93 | 102 | 107 | 107 |
| MA100 (base 100) | 100 | 85 | 100 | 95 | 95 |
| Breaking energy at 60° C. (base 100) | 100 | 122 | 130 | 154 | 160 |
| Mean of the performances (base 100) | 100 | 100 | 111 | 119 | 121 |

Compared with the control compositions, it is noted that compositions C1 to C3 in accordance with the invention make it possible to improve the performance compromise between rolling resistance, wear resistance and tear strength as shown by the measurements in Table 3.

The invention claimed is:

1. A rubber composition based on at least an elastomer, a reinforcing filler, a crosslinking system, and a crumb rubber, wherein the crumb rubber has an isoprene elastomer content of greater than 50 phr in the composition of the rubber crumb and a chloroform extract with a weight-average molecular weight of less than 10,000 g/mol.

2. The rubber composition according to claim 1, wherein the crumb rubber has an isoprene elastomer content within a range extending from 60 to 100 phr.

3. The rubber composition according to claim 1, wherein the isoprene elastomer in the crumb rubber is selected from the group consisting of synthetic polyisoprenes, natural rubbers and mixtures thereof.

4. The rubber composition according to claim 1, wherein the isoprene elastomer in the crumb rubber is a natural rubber.

5. The rubber composition according to claim 1, wherein the crumb rubber is present in a content ranging from 5% to 40% by weight.

6. The rubber composition according to claim 1, wherein the crumb rubber is present in a content ranging from 5 to 100 phr.

7. The rubber composition according to claim 1, wherein the crumb rubber has an acetone extract of between 3% and 30% by weight.

8. The rubber composition according to claim 1, wherein the crumb rubber has a chloroform extract of between 5% and 85% by weight.

9. The rubber composition according to claim 1, wherein the crumb rubber has not undergone any modification by a process selected from the group consisting of thermal, mechanical, biological, and chemical treatments and combinations thereof.

10. The rubber composition according to claim 9, wherein the crumb rubber has an acetone extract of between 3% and 15% by weight.

11. The rubber composition according to claim 9, wherein the crumb rubber has a chloroform extract of between 3% and 20% by weight.

12. The rubber composition according to claim 9, wherein the crumb rubber has a ratio of a chloroform extract to an acetone extract, expressed as weight percentage, of less than 1.5.

13. The rubber composition according to claim 9, wherein the crumb rubber has a chloroform extract with a weight-average molecular weight of less than 8000 g/mol.

14. The rubber composition according to claim 1, wherein the crumb rubber has an average particle size D50 of between 10 and 400 μm.

15. The rubber composition according to claim 1, wherein the crumb rubber has a carbon black weight fraction ranging from 20% to 40%.

16. The rubber composition according to claim 1, wherein the elastomer predominantly comprises an elastomer selected from the group consisting of essentially unsaturated diene elastomers.

17. The rubber composition according to claim 16, wherein the predominant elastomer is selected from the group consisting of polybutadienes, polyisoprenes, butadiene copolymers, isoprene copolymers and mixtures thereof.

18. The rubber composition according to claim 17, wherein the predominant elastomer is selected from the group consisting of polybutadienes, polyisoprenes and mixtures thereof.

19. The rubber composition according to claim 1, wherein the reinforcing filler is selected from the group consisting of silicas, carbon blacks, and mixtures thereof.

20. The rubber composition according to claim 1, wherein a content of reinforcing filler is within a range extending from 5 to 200 phr.

21. The rubber composition according to claim 1, wherein a predominant reinforcing filler is carbon black in a content within a range extending from 30 to 90 phr.

22. The rubber composition according to claim 1, wherein a predominant reinforcing filler is silica in a content within a range extending from 30 to 90 phr.

23. A tire comprising the rubber composition according to claim 1.

24. The tire according to claim 23, wherein the rubber composition constitutes all or part of a tread of the tire.

* * * * *